United States Patent
Nichols et al.

(10) Patent No.: US 9,164,178 B2
(45) Date of Patent: Oct. 20, 2015

(54) TRANSMITTING LOCATION INFORMATION OF A BEACON

(75) Inventors: Thomas S. Nichols, La Habra, CA (US); Hector M. Reyes, Jr., Richardson, TX (US)

(73) Assignee: Thales-Raytheon Systems Company, LLC, Fullerton, CA (US)

( * ) Notice: Subject to any disclaimer, the term of this patent is extended or adjusted under 35 U.S.C. 154(b) by 965 days.

(21) Appl. No.: 12/713,785

(22) Filed: Feb. 26, 2010

(65) Prior Publication Data

US 2010/0214163 A1    Aug. 26, 2010

Related U.S. Application Data

(60) Provisional application No. 61/155,753, filed on Feb. 26, 2009.

(51) Int. Cl.
| | |
|---|---|
| *G01S 13/42* | (2006.01) |
| *G01S 19/18* | (2010.01) |
| *G01S 5/02* | (2010.01) |
| *G01S 19/41* | (2010.01) |
| *G01S 5/00* | (2006.01) |

(52) U.S. Cl.
CPC .............. *G01S 19/41* (2013.01); *G01S 5/0027* (2013.01); *G01S 5/0284* (2013.01); *G01S 13/42* (2013.01); *G01S 19/18* (2013.01)

(58) Field of Classification Search
USPC ............... 342/385–386, 357.55, 357.56, 450, 342/458, 56, 133, 139–144, 146, 59, 126; 244/3.15–3.16; 89/1.11
IPC ..................... G01S 19/17,19/18, 5/0027, 5/021, G01S 5/0284, 13/42; F41G 7/34
See application file for complete search history.

(56) References Cited

U.S. PATENT DOCUMENTS

| 3,833,904 | A | * | 9/1974 | Gebhardt et al. | 342/83 |
|---|---|---|---|---|---|
| 5,396,243 | A | * | 3/1995 | Jalink et al. | 342/54 |
| 5,459,470 | A | * | 10/1995 | Wootton et al. | 342/54 |
| 5,717,406 | A | * | 2/1998 | Sanderford et al. | 342/457 |
| 5,913,170 | A | * | 6/1999 | Wortham | 455/457 |
| 5,920,279 | A | * | 7/1999 | Andersson | 342/59 |
| 6,252,544 | B1 | * | 6/2001 | Hoffberg | 342/357.31 |
| 6,317,237 | B1 | | 11/2001 | Nakao et al. | |
| 6,373,426 | B1 | * | 4/2002 | Hellsten | 342/59 |
| 6,545,633 | B1 | * | 4/2003 | Jensen | 342/59 |
| 6,567,041 | B1 | * | 5/2003 | O'Dell | 342/357.44 |
| 6,567,044 | B2 | * | 5/2003 | Carroll | 342/465 |
| 6,850,013 | B1 | | 2/2005 | Ashley et al. | |

(Continued)

OTHER PUBLICATIONS

S. Basagni et al., A distance routing effect algorithm for mobility (DREAM), Proceedings of the 4th annual ACM/IEEE international conference on Mobile computing and networking, p. 76-84, 1998.*

(Continued)

*Primary Examiner* — Gregory C Issing
*Assistant Examiner* — Fred H Mull

(57) ABSTRACT

According to one embodiment of the present invention, determining the location of a target of interest includes determining a beacon location of the beacon. The beacon location is transmitted to a sensor. The sensor is operable to determine a sensor location of the sensor. The sensor is further operable to determine a target location of the target according to the beacon location and the sensor location. The target location is distinct from the beacon location.

9 Claims, 2 Drawing Sheets

(56) References Cited

U.S. PATENT DOCUMENTS

| | | | |
|---|---|---|---|
| 7,338,009 B1* | 3/2008 | Bobinchak et al. | 244/3.15 |
| 2003/0083076 A1* | 5/2003 | Pradhan et al. | 455/456 |
| 2005/0229227 A1* | 10/2005 | Rogers | 725/115 |
| 2006/0238406 A1* | 10/2006 | Nohara et al. | 342/90 |
| 2007/0085734 A1* | 4/2007 | Whitehead et al. | 342/357.02 |
| 2007/0210923 A1* | 9/2007 | Butler et al. | 340/572.8 |
| 2007/0276590 A1* | 11/2007 | Leonard et al. | 701/207 |
| 2010/0097262 A1* | 4/2010 | Hong et al. | 342/52 |
| 2011/0305260 A1* | 12/2011 | McManus | 375/130 |

OTHER PUBLICATIONS

A. Savvides et al., Dynamic Fine-Grained Localization in Ad-Hoc Networks of Sensors, Proceedings of the 7th Annual International Conference on Mobile Computing and Networking, p. 166-179, 2001.*

A. Savvides et al., The Bits and Flops of the N-hop Multilateration Primitive for Node Localization Problems, Proceedings of the 1st ACM International Workshop on Wireless Sensor Networks and Applications, Sep. 2002.*

B. Freeman, A Target Tracking Algorithm that Reduces Designation Time, http://www.dtic.mil/ndia/2006garm/wednesday/freeman.pdf, Mar. 2006.*

Northrop Grumman News Release, Northrop Grumman to Supply Army With Additional Lightweight Laser Designator Rangefinder Systems, http://www.irconnect.com/noc/press/pp./news_printer.html?d=144423, Jun. 2008.*

V.I. Kostylev, Geometry of Bistatic Radars, in M. Cherniakov (editor), Bistatic Radar: Principles and Practice, John Wiley & Sons, Ltd, p. 225-241, 2007.*

* cited by examiner

TRANSMITTING LOCATION INFORMATION OF A BEACON

RELATED APPLICATION

This application claims benefit under 35 U.S.C. §119(e) of U.S. Provisional Application Ser. No. 61/155,753, entitled "Global Positioning System Beacon," filed Feb. 26, 2009, by Thomas S. Nichols, which is incorporated herein by reference.

TECHNICAL FIELD OF THE INVENTION

This invention relates generally to the field of object detection systems and more specifically to transmitting location information of a beacon.

BACKGROUND

Detection sensors attempt to determine the location of a target of interest in a particular geographic region. These sensors may make certain location-based measurements of a target in order to make that determination. Because of issues associated with sensing technology, conventional detection sensors cannot guarantee the accuracy of these location-based measurements.

SUMMARY OF THE DISCLOSURE

In accordance with the present invention, disadvantages and problems associated with previous techniques for detecting a target of interest may be reduced or eliminated.

According to one embodiment of the present invention, determining the location of a target of interest includes determining a beacon location of the beacon. The beacon location is transmitted to a sensor. The sensor is operable to determine a sensor location of the sensor. The sensor is further operable to determine a target location of the target according to the beacon location and the sensor location. The target location is distinct from the beacon location.

Certain embodiments of the invention may provide one or more technical advantages. A technical advantage of one embodiment may be that a sensor is able to receive a transmission from a beacon comprising the beacon's location. The sensor may use the information transmitted by the beacon to determine location values for a target of interest. Using the information transmitted may allow for improvement in the accuracy in the determination of the location of a target of interest.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
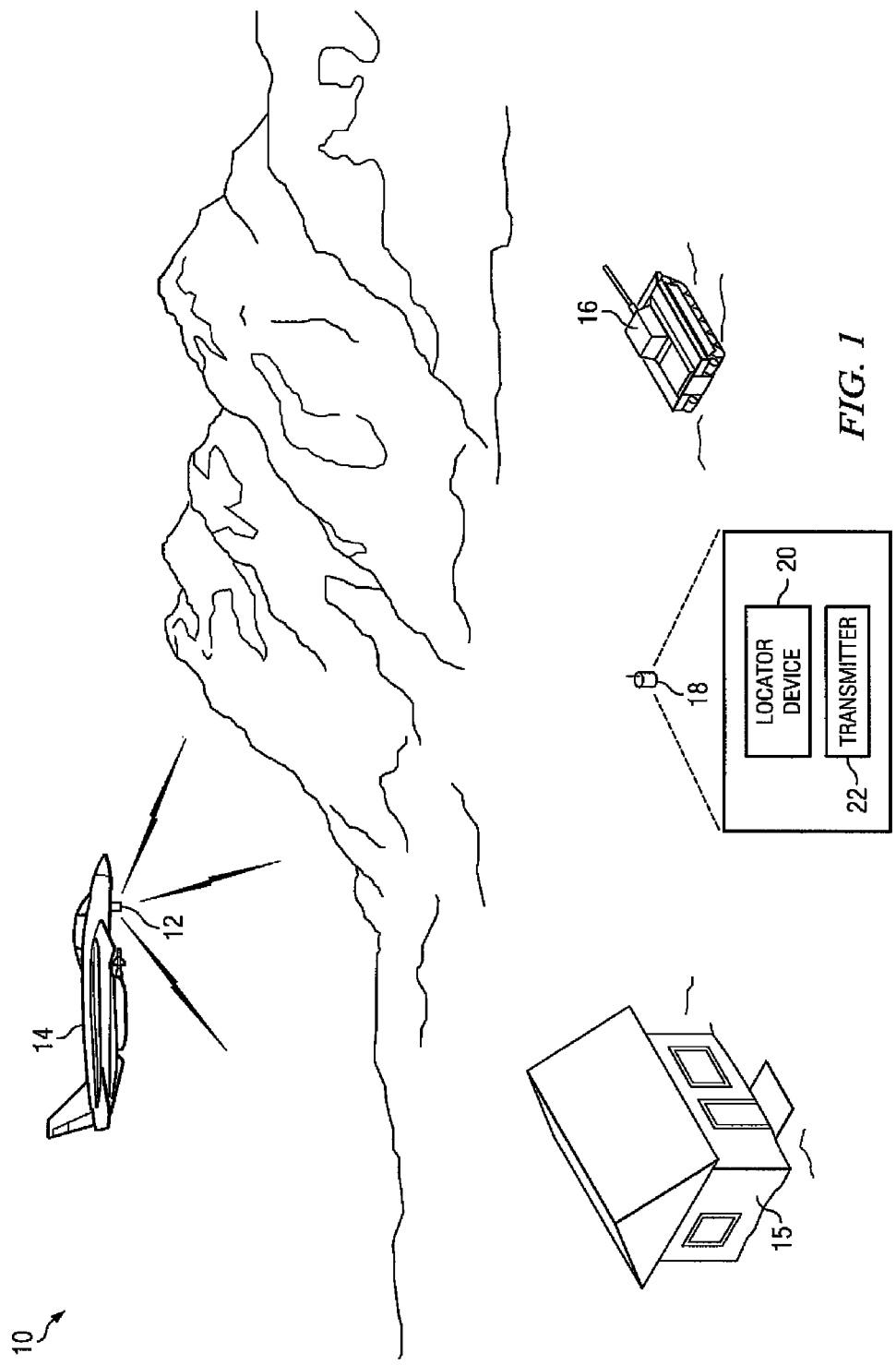
FIG. 1 illustrates an embodiment of a system configured to calculate the geographical location of one or more targets of interest.
Figure 2:
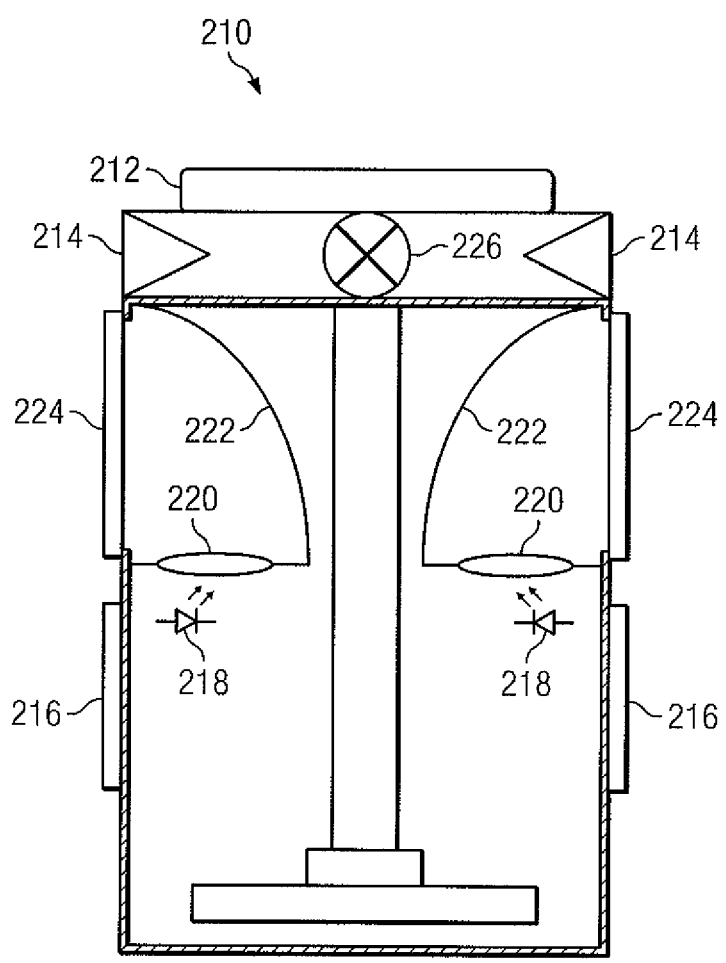
FIG. 2 is a block diagram illustrating a cross-section of an example embodiment of a beacon operable to transmit location information to a sensor.

Embodiments of the present invention and its advantages are best understood by referring to FIGS. 1 and 2 of the drawings, like numerals being used for like and corresponding parts of the various drawings.

FIG. 1 illustrates an embodiment of a system 10 configured to calculate the geographical location of one or more targets of interest. In this embodiment, a sensor 12 located on a platform 14 takes one or more location-based measurements of one or more targets of interest in system 10, such as a structure 15 or tank 16. Sensor 12 may also take one or more location-based measurements of a beacon 18. Beacon 18 is operable to transmit information representing its geographical location such that the sensor 12 may detect this information. Sensor 12 may be able to use the information transmitted by beacon 18 along with the location-based measurements of sensor 12 to calculate a more accurate geographical location of the target of interest.

The targets of interest may be any of a range of targets. FIG. 1 depicts structure 15 and tank 16 as targets of interest, however, it should be appreciated that these are two of many possible targets. System 10 may have many more targets of interest of varying size and shape not illustrated explicitly in FIG. 1. For example, the targets could include bunkers, geographical formations (such as mountains or lakes), aircraft, or people. The targets may be stationary, such as structure 15, or capable of movement, such as tank 16. The targets may comprise any materials or compositions detectable by sensor 12. A target of interest may be distinct from beacon 18 in that they do not share the same geographical location.

Beacon 18 comprises a locator device 20 and a transmitter 22. Locator device 20 can be one or more devices suitable to indicate the location of beacon 18. In one embodiment, locator device 20 may comprise a global positioning system (GPS) receiver operable to receive information from one or more GPS satellites to determine the location of beacon 18. In other embodiments, locator device 20 may comprise a device operable to determine the location of beacon 18 by detecting a predetermined reference point somewhere in system 10, such as a mountain or tower, for example. The locator device 20 may then extrapolate the beacon location based on this predetermined reference point. In yet other embodiments, locator device 20 may comprise a device operable to communicate with one or more devices proximate beacon 18, which operate to determine the location of beacon 18 and then to transmit that location to locator device 20. In yet other embodiments, locator device 20 may comprise a device configured to indicate a fixed location of beacon 18. In these embodiments, the locator device 20 may be configured to indicate a fixed location before beacon 18 is deployed.

Transmitter 22 comprises one or more transmitters operable to transmit information indicating the location from locator device 20 to sensor 12. The information may comprise, for example, geographical coordinates in any suitable coordinate system. In certain embodiments, this information may comprise a geographical location relative to some reference point not pictured in FIG. 1. Transmitter 22 may transmit information to sensor 12 using one or more transmission media including radio frequency waves, visible or ultraviolet light/laser signals, infrared signals, and/or acoustic signals.

In certain embodiments, beacon 18 may be placed at any suitable location in using any of several deployment mechanisms. For example, using unattended ground sensor (UGS) technology, beacon 18 can be fired from a gun or dropped from an aircraft. As another example, beacon 18 may be deployed from the same object that comprises sensor 12, such as platform 14 in the embodiment depicted in FIG. 1. In other examples, beacon 18 may be deployed from a tank or thrown from a protective bunker on a battlefield. In yet other examples, beacon 18 may also be manually placed at its location by a scout vehicle or a person operating in a particular geographical region of interest.

In certain embodiments, beacon 18 may penetrate the ground. For example, beacon 18 may be fired from a gun and penetrate the ground due to the force of impact. In other examples, beacon 18 may be configured to burrow into the ground. Fixing beacon 18 to the ground may prevent beacon 18 from changing locations because of, for example, various weather elements or being carried by an animal, vehicle, or person. This may help to more accurately determine the location of beacon 18. If beacon 18 penetrates the ground, it may deploy one or more of its components, such as locator device 20 and/or transmitter 22, via a telescoping element. This may help to orient beacon 18 such that its components may better receive and transmit signals.

Platform 14 may be any of a range of structures suitable to position sensor 12 at a location in system 10. In certain embodiments, platform 14 may be an aircraft as depicted in FIG. 1. In other embodiments platform 14 could be a tank, a rocket launcher, a barracks, a person, or any other suitable structure. In still other embodiments, system 10 may not comprise a platform 14. In these embodiments, sensor 12 may comprise a stand-alone sensor.

Sensor 12 is capable of measuring location attributes of one or more objects in system 10, such as structure 15, tank 16 and beacon 18 as non-limiting examples. These location attributes may include one or more relative position coordinates such as range, azimuth and/or elevation of the object with respect to sensor 12. These location attributes may also include other attributes that can be used to calculate relative position coordinates of the object relative to sensor 12 in any convenient coordinate system. As non-limiting examples of techniques of determining location attributes, sensor 12 may use a radio detection and ranging system (RADAR), light detection and ranging system (LADAR), and/or forward looking infrared radar (FLIR). Sensor 12 also comprises a device capable of indicating the geographical location of the sensor 12. This device could comprise any of the devices listed above as possibilities for locator device 20, such as a GPS device.

In certain embodiments, sensor 12 may more accurately determine a location attribute of a target of interest by calibrating its measurements with the location information transmitted by beacon 18. Given the location information transmitted by beacon 18 and the location attributes of sensor 12, one or more location attributes of beacon 18 may be more accurately determined with respect to sensor 12. With this calculation, the location of a target of interest may be more accurately determined.

Sensor 12 may use the information transmitted by beacon 18 in any suitable manner. In one embodiment, sensor 12 knows its own geographical coordinates $c_s$, using a GPS device, for example. Sensor 12 may use its detection capabilities to measure location attributes, such as range to the beacon $r_b$, azimuth angle to the beacon $a_b$, and elevation angle to the beacon $e_b$. Sensor 12 receives the coordinates transmitted from the beacon $c_b$ and can calculate location attributes $r_b'$, $a_b'$, and $e_b'$, from $c_b$ and $c_s$. Sensor 12 can then compare the measured attribute $r_b$, $a_b$, and $e_b$ with the calculated values $r_b'$, $a_b'$, and $e_b'$, respectively, to generate a correction factor for each location value (distance, azimuth, and elevation). The correction factor for a location attribute may be the difference between the measured and calculated amounts of the location value.

Sensor 12 uses its detection capabilities to measure range to the target $r_t$, azimuth angle to the target $a_t$, and elevation angle to the target $e_t$. Sensor 12 can then apply the correction factors to each of the measurements of $r_t$, $a_t$, and $e_t$ to obtain corrected values of those measurements. For example, sensor 12 may subtract a correction factor from its corresponding measurement to obtain a corrected value of the measurement. With these corrected values, sensor 12 may calculate the geographical location of the target of interest as coordinates $c_t$. The accuracy of these calculations depends directly on the accuracy of $c_b$ and $c_s$.

The location of target of a interest in system 10 may be determined in several other ways. In some embodiments, sensor 12 determines $r_b$, the range from sensor 12 to beacon 18, and $r_t$, the range from the sensor to a target. Sensor 12 also determines the angle b-s-t between the beacon and the target with respect to sensor 12. Using coordinates $c_b$ and $c_s$ in combination with these other measurements, sensor 12 may determine $c_t$, the coordinates of a target of interest. Certain embodiments of system 10 may use a technique of triangulation where multiple sensors 12 at different locations measure bearing angles (azimuth and/or elevation) of a target of interest with respect to the individual sensor 12. The location of the target of interest may then use these measurements and known locations of the sensors to calculate the target location. Some embodiments of system 10 may use a similar technique, trilateration, in which multiples sensors 12 placed at different locations measure the range to a target with respect to the individual sensor to determine the target location. In any of these embodiments, correction factors may be determined in a manner similar to that described above to more accurately determine the target location. In certain embodiments, sensor 12 may use the location of beacon 18 as a reference point in an image. In these embodiments, sensor 12 may determine the location of a target in an image relative to the location of beacon 18 in the image.

Modifications, additions, or omissions may be made to system 10 and the apparatuses disclosed herein without departing from the scope of the invention. The components of system 10 and the apparatuses disclosed herein may be integrated or separated. Moreover, the operations of system 10 may be performed by more, fewer, or other components. For example, the operations of locator device 20 and transmitter 22 may be performed by one component, or the operations of transmitter 22 may be performed by more than one component. Additionally, operations of system 10 and the apparatuses disclosed herein may be performed using any suitable logic comprising software, hardware, and/or other logic. As used in this document, "each" refers to each member of a set or each member of a subset of a set.

A component of system 10 and the apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executing instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

FIG. 2 is a block diagram illustrating a cross-section of an example embodiment of a beacon 210 operable to transmit location information to a sensor. This embodiment of beacon 210 comprises a GPS receiver device 212 and transmitter devices 214, 216, and 218 operable to transmit location information as a visible or ultraviolet signal, radio frequency signal, and infrared signal, respectively, to a sensor similar to sensor 12 depicted in FIG. 1. Beacon 210, however, may comprise any suitable locator device and one or more of any suitable transmitters.

Beacon 210 may have various sizes in different embodiments. For example, beacon 210 may be a size suitable for deployment from a firing mechanism. In certain of these embodiments, beacon 210 may have a weight/mass such that the firing mechanism deploys beacon 210 at a desired distance. In another example, beacon 210 may be of relatively small size such that it is generally undetectable by enemy agents on a battlefield. In yet another example, beacon 210 may have a weight that keeps it generally stationary and immovable by weather elements such as wind. In any of these examples, beacon 210 may take on various shapes such as a cylinder, sphere, or rectangular/square block, as non-limiting examples.

In certain embodiments, GPS receiver device 212 is operable to receive information from one or more GPS satellites to determine the location of beacon 210. GPS receiver device 212 is further operable to indicate the location of beacon 210 to one or more of the transmitters 214, 216, and/or 218.

In certain embodiments, one or more of the transmitters of beacon 210 may be configured to transmit information actively, that is, independently of a request for beacon 210 to transmit its location. For example, a transmitter in beacon 210 may continuously transmit signals comprising location information. An analog light transmitter, for instance, may be configured to continuously transmit information as a light signal. In another example, a transmitter in beacon 210 may transmit a signal periodically according to one or more predetermined time intervals. In other embodiments, one or more transmitters of beacon 210 may transmit passively by reflecting and modulating a signal sent from outside beacon 210 instead of generating the transmitted signal on its own. It should be appreciated that transmitting includes both active and passive transmission.

In certain embodiments, one or more corner reflectors 214 act as laser transmitters operable to transmit location information as a laser or other light signal. In some embodiments, beacon 210 may have one corner reflector. In other embodiments, beacon 210 may have two, three, four or more corner reflectors 214 arranged evenly around beacon 210. In still other embodiments, beacon 210 may have one or more corner reflectors 214 that cover only portions of the perimeter of beacon 210. In these embodiments, corner reflectors 214 may cover portions of the perimeter of beacon 210 oriented toward the sensor.

The sensor may reflect a laser signal in the direction of beacon 210. Corner reflectors 214 are configured such that they are capable of reflecting the laser signal in the direction from which it came. In certain embodiments, the reflected laser signal may be modulated mechanically by vibrating corner reflectors 214 such that the reflected laser signal comprises location information of beacon 210. In the embodiments, these sensors may comprise laser sensing functionality operable to demodulate the reflected laser signal in order to retrieve the location information communicated in the reflected laser signal.

In certain embodiments, beacon 210 may transmit a radar or radio frequency signal using one or more radar corner reflectors similar to corner reflectors 214. In these embodiments, the sensor may reflect a radar signal in the direction of beacon 210. The radar corner reflector may reflect a modulated radar signal back to the sensor in much the same way as described above for a laser signal with corner reflector 214.

In certain embodiments, one or more radio frequency identification (RFID) tags 216 act as radio transmitters operable to transmit location information as a radar or other radio frequency signal. In some embodiments, beacon 210 may have one RFID tag operable to reflect a signal in one or more directions. In other embodiments, beacon 210 may have multiple RFID tags 216 arranged evenly around beacon 210. In still other embodiments, beacon 210 may have one or more RFID tags 216 that cover only portions of the perimeter of beacon 210. In these embodiments, RFID tags 216 may cover portions of the perimeter of beacon 210 oriented toward the sensor.

RFID tag 216 may comprise an RFID code that may be configured to comprise location information of beacon 210. RFID tag 216 is operable to transmit location information to the sensor. In some embodiments, the sensor may comprise radar sensing functionality operable to process the radar signal in order to retrieve the location information communicated in the radio frequency signal.

In certain embodiments, one or more light emitting diodes (LEDs) or lasers 218 act as infrared or laser transmitters operable to transmit location information as an infrared, ultraviolet, visible, or other signal. Reference made to LED(s) 218 throughout this disclosure may refer to LED(s) or laser(s) or both. In one embodiment, the signal may be modulated using a pulse code or other method for encoding information in an infrared signal. In other embodiments, the pulses may be generated as visible or ultraviolet signals.

In some embodiments, a lens 220, a reflector 222, and a window 224 may be configured to direct the signal toward the sensor. For example, lens 220 may be positioned between LED 218 and reflector 222. Lens 220 and reflector 222 operate in combination to broadcast the signal through window 224 to potential sensors over a wide extent in azimuth and elevation. In some embodiments, the sensor may comprise forward-looking infrared (FLIR) sensing technology or other technology compatible with the signal operable to interpret the signal in order to retrieve the location comprised in the signal.

In some embodiments, beacon 210 may be cylindrical in shape such that one or more LEDs 218, one lens 220, one reflector 222, and one window 224 encircle most or all the perimeter of beacon 210. In other embodiments, beacon 210 may have multiple LEDs 218, lenses 220, reflectors 222, and windows 224 arranged evenly around beacon 210. In still other embodiments, beacon 210 may have one or more LEDs 218, lenses 220, reflectors 222, and windows 224 that cover only portions of the perimeter of beacon 210. In these embodiments, LEDs 218, lenses 220, reflectors 222, and windows 224 may cover portions of the perimeter of beacon 210 oriented toward the sensor.

Although some of the transmitters in FIG. 2 have been described as operable to send only one type of transmission (ultraviolet, visible, infrared, or radio frequency/radar), certain embodiments of beacon 210 may use similar transmitters for different types of transmission without departing from the scope of the present disclosure.

Beacon 210 may also comprise other transmitters operable to transmit location information through ultraviolet, visible, infrared, or radio frequency/radar signals though not explicitly illustrated in the embodiment depicted in FIG. 2. For example, certain embodiments may use an electric heater as an infrared light source. In these embodiments, the infrared signal may be modulated to include location information by, for example, mechanically interposing a mask over the heat source to transmit infrared pulses.

The embodiment of beacon 210 illustrated in FIG. 2 comprises multiple types of transmitters. In other embodiments, beacon 210 may use fewer or more types of transmitters. For example, in one embodiment beacon 210 may comprise a laser transmitter as its only type of transmitter. In another embodiment, beacon 210 may comprise an acoustic transmitter operable to transmit a sound signal comprising location information in addition to the transmitters depicted in the embodiment illustrated in FIG. 2.

In certain embodiments, the transmitters of beacon 210 may be configured to transmit their signals omni-directionally such that the sensor may be positioned at a location at any azimuth from beacon 210. For example, beacon 210 may use a modulator 226 to modulate the laser signal reflected by corner reflectors 214. Modulator 226 may comprise two transducers configured to be at right angles to each other and 90 degrees out of phase. Modulator 226 may vibrate corner reflectors 214 in a circular pattern that allows the laser signal to be detected by a sensor at any azimuth from beacon 210. In another example, lens 220 and reflector 222 may be configured such that they encircle the perimeter of beacon 210 as described above. In this example, light generated by one or more LEDs 216 or by an electric heater may travel omni-directionally from beacon 210.

In certain embodiments, one or more of the transmitters of beacon 210 may be configured to transmit information in response to interrogation, that is, in response to a request for beacon 210 to transmit its location. Corner reflector 214, for example, may operate to reflect a laser signal only after an incident laser has contacted a surface of corner reflector 214. In other examples, beacon 210 may comprise functionality operable to communicate with one or more devices located somewhere outside of beacon 210. In these examples, beacon 210 may transmit a signal comprising location information in response to an instruction from one or more of these devices. In yet another example, a transmitter in beacon 210 may transmit a signal in response to a natural stimulus outside of the beacon. A change in the state of the weather is one example of a natural stimulus.

In certain embodiments, one or more transmitters of beacon 210 may be configured to operate as an identification friend-or-foe/selective identification feature (IFF/SIF) transponder. When acting as an IFF/SIF transponder, a transmitter of beacon 210 may communicate with whatever device it perceives as requesting transmission of its location information. When a predetermined action occurs, such as the device sending an interrogation message, beacon 210 transmits location information via one or more of its transmitters.

In certain embodiments, beacon 210 may transmit information in addition to location information. For example, beacon 210 may provide authentication information by including an identification number in the information transmitted to the sensor. In certain embodiments, the identification number may correspond to an encryption key used to encrypt the location information transmitted by beacon 210. The sensor may use the identification number to look up the encryption key. Using the encryption key, the sensor may decrypt the location information and retrieve the location of beacon 210. In this manner, use of beacon 210 may be restricted to sensors that can properly determine what encryption key is associated with a particular identification number.

Additionally, encryption of location information reduces the chance of detecting location information where none exists or where an enemy agent generates false location information using a similar transmission medium and messaging protocol as those utilized in a valid beacon 210. For example, if the sensor decrypts what it perceives to be a location and the location is not in an area predetermined to contain beacon 210, the sensor may reject or disregard the transmission.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method of locating a target, comprising:
   determining, with a sensor, a sensor location of the sensor;
   receiving, by the sensor, a transmission from a beacon, the beacon comprising:
      a location device operable to determine the beacon location of the beacon, and
      one or more transmitters operable to transmit the beacon location to the sensor,
      wherein the transmission comprises the beacon location;
   measuring, by the sensor, one or more location attributes of the beacon;
   determining, by the sensor, a target location of a target, wherein the sensor:
      performs a target location measurement by sending and receiving reflected radiation and without receiving a transmission from the target,
      calculates a correction factor from a difference in the measured one or more location attributes of the beacon and the beacon location as transmitted to the sensor by the beacon, and
      applies the correction factor to the target location measurement to obtain a corrected target location measurement, wherein the target location, the sensor location, and the beacon location are distinct from one another.

2. The method of claim 1, deploying the beacon at the beacon location by a deployment mechanism.

3. The method of claim 1, the method further comprising receiving information from one or more GPS satellites to determine the beacon location.

4. The method of claim 1, the method further comprising transmitting the beacon location using a radio frequency signal.

5. The method of claim 1, the method further comprising transmitting the beacon location using a laser signal.

6. The method of claim 1, the method further comprising transmitting the beacon location using an infrared signal.

7. The beacon of claim 1, the method further comprising transmitting the beacon location independently of a request for the beacon to transmit the beacon location.

8. The method of claim 1, the method further comprising transmitting the beacon location in response to a request for the beacon to transmit the beacon location.

9. The method of claim 1, the sensor operable to determine the correction factor by:
   measuring a location of the beacon; and
   determining the correction factor from a difference in the measured location of the beacon and the beacon location transmitted by the beacon.

\* \* \* \* \*